July 5, 1927.
L. E. LA BRIE
1,635,088
WHEEL WITH BRAKE DISK
Filed Sept. 21, 1925
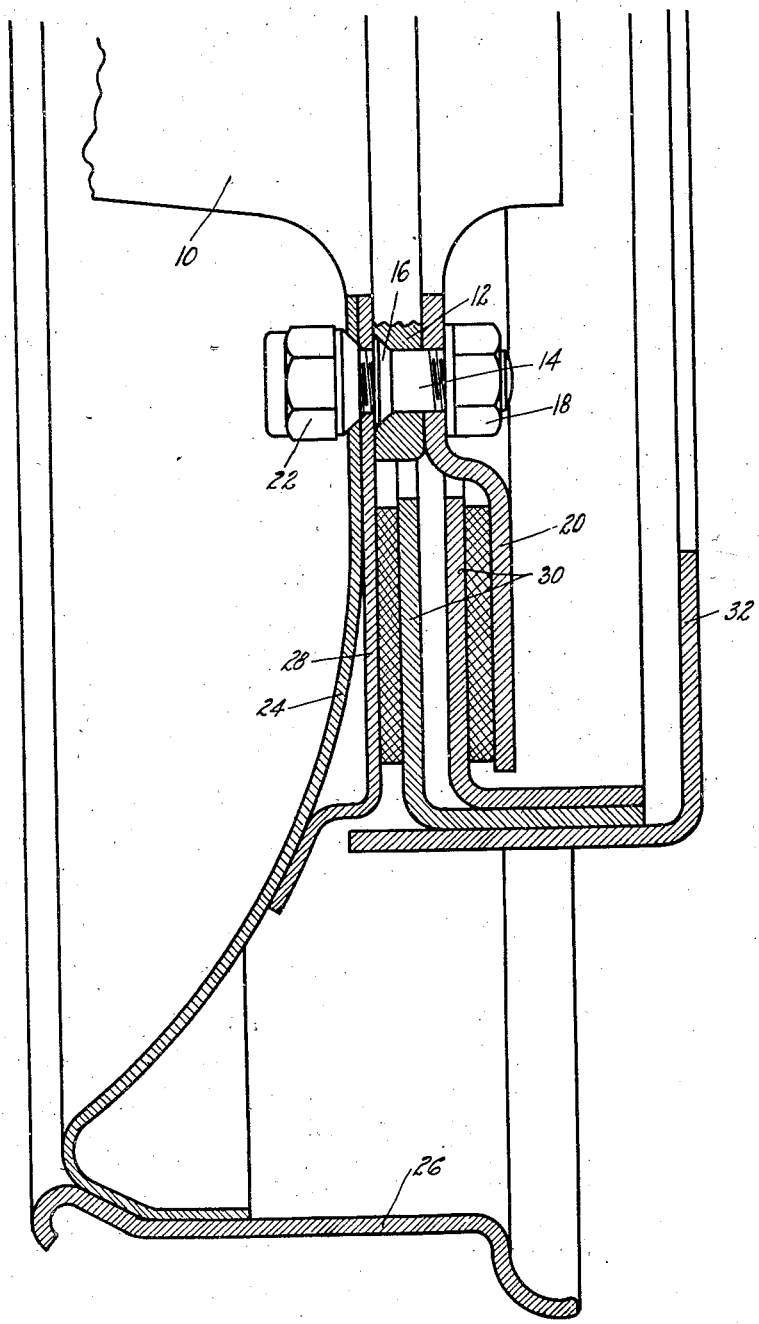
INVENTOR
LUDGER E. LA BRIE
BY
ATTORNEY Patented July 5, 1927.

1,635,088

UNITED STATES PATENT OFFICE.

LUDGER ELIZÉ LA BRIE, OF SOUTH BEND, INDIANA, ASSIGNOR TO MOTOR INDUSTRIES, INC., OF CHICAGO, ILLINOIS, A CORPORATION OF ILLINOIS.

WHEEL WITH BRAKE DISK.

Application filed September 21, 1925. Serial No. 57,556.

This invention relates to wheels, and is illustrated as embodied in the disk wheel of an automobile. An object of the invention is to arrange the wheel and associated parts in such a manner as to use the wheel as part of a disk brake, i. e. a brake having generally radial friction surfaces.

Having this object in mind, the wheel disk body is provided with an inner radial braking surface, preferably on a stamping secured to the back of the disk proper, and facing a similar cooperating surface on a braking part rotating with the wheel. In one desirable arrangement, the wheel body and the braking part are secured in a novel manner to a flange on the wheel hub.

These and other features of the invention, including various novel and desirable particular constructions, will be apparent from the following description of one illustrative embodiment shown in the accompanying drawing, in which:

The figure is a radial section through one-half of my improved wheel and associated parts.

The wheel is illustrated as having a suitable rotatably-mounted hub 10 having a flange 12, carrying studs 14 with collars 16 engaging the outer face of the flange and with inwardly and outwardly projecting threaded ends. On the inner ends of studs 14 are nuts 18, holding demountably clamped against the inner face of flange 12 a braking part 20, having an outwardly-facing radial plane braking surface.

On the outer ends of studs 14 are nuts 22, holding demountably clamped against the outer face of the flange 12 the wheel disk body 24, illustrated as flaring outwardly to a rim 26 demountably or permanently secured thereon. I prefer that a braking member such as a stamping 28 be welded or otherwise secured to the inner face of the disk 24, engaging the studs 14 so as to transmit the braking torque directly to flange 12.

The brake itself, which forms no part of the present invention, includes two separable friction disks 30 within a housing 32. When disks 30 are separated to apply the brake, they engage the parallel radial surfaces on part 20 and stamping 28.

While one illustrative embodiment has been described in detail, it it not my intention to limit the scope of the invention to that particular embodiment, or otherwise than by the terms of the appended claims.

I claim:

1. A wheel comprising a rotating hub with a flange, in combination with a wheel disk and a braking disk having braking surfaces on their adjacent sides and which disks engage the flange, together with means for securing the disks to the flange.

2. A wheel comprising a rotating hub with a flange, in combination with a wheel disk and a braking disk having braking surfaces on their adjacent sides and which disks engage the flange, together with means for demountably securing the disks independently to the flange.

3. A wheel comprising a rotating hub with a flange, in combination with a wheel disk and a braking disk having braking surfaces on their adjacent sides and which disks engage the flange, together with studs carried by the flange having opposite threaded ends projecting respectively through the two disks, and nuts on said ends for separately demountably holding the two disks.

4. A wheel comprising a rotating hub with a flange, in combination with a wheel disk and a braking disk having braking surfaces on their adjacent sides and which disks engage the opposite sides of the flange, together with means for securing the disks to the flange.

5. A wheel comprising a wheel disk body flaring outwardly and having secured on its inner side a stamping providing a radially extending plane braking surface, in combination with a part rotating with the disk body and having a cooperating radially-extending plane braking surface facing the braking surface on the stamping.

6. A wheel comprising a wheel disk body flaring outwardly and having secured on its inner side a member providing a radially-extending braking surface, in combination with a part rotating with the disk body and having a cooperating radially-extending braking surface facing the braking surface on the member.

7. A wheel comprising a hub having a driving flange, with studs carried by the flange having collars engaging the outer side of the flange and with threaded ends projecting in opposite directions from the flange, in combination with a radially-extending disk brake member engaging the inner face of the flange and nuts threaded on the inner ends of the studs and clamping the brake member against the flange, and a wheel disk body carrying a cooperating radially-extending disk brake member, the outer ends of the studs projecting through openings in the body and cooperating member, and nuts on said outer ends to hold the body and cooperating member.

8. A wheel comprising a hub having a driving flange, with studs carried by the flange having collars engaging the outer side of the flange and with threaded ends projecting in opposite directions from the flange, in combination with a radially-extending disk brake member engaging the inner face of the flange and nuts threaded on the inner ends of the studs and clamping the brake member against the flange, and a wheel disk body having a cooperating radially-extending disk brake part, and nuts on the outer ends of the studs to hold the body and cooperating part.

In testimony whereof, I have hereunto signed my name.

LUDGER ELIZÉ LA BRIE.